United States Patent
Cardonha et al.

(10) Patent No.: US 11,768,923 B2
(45) Date of Patent: Sep. 26, 2023

(54) MEDIA TRANSACTIONS CONSENT MANAGEMENT

(71) Applicant: International Business Machines Corporation, Armonk, NY (US)

(72) Inventors: Carlos Henrique Cardonha, São Paulo (BR); Marisa Affonso Vasconcelos, São Paulo (BR); Andrea Britto Mattos Lima, São Paulo (BR); Miguel Paredes Quinones, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 16/528,849

(22) Filed: Aug. 1, 2019

(65) Prior Publication Data
US 2021/0034717 A1    Feb. 4, 2021

(51) Int. Cl.
G06F 21/12    (2013.01)
G06F 16/58    (2019.01)
G06F 21/62    (2013.01)

(52) U.S. Cl.
CPC .......... *G06F 21/12* (2013.01); *G06F 16/5866* (2019.01); *G06F 21/6245* (2013.01); *G06F 2221/0713* (2013.01)

(58) Field of Classification Search
CPC .............. G06F 21/6245; G06F 21/6254; G06F 3/0484; G06F 16/434; G06F 21/10
See application file for complete search history.

(56) References Cited

U.S. PATENT DOCUMENTS

| | | | |
|---|---|---|---|
| 7,225,158 B2 | 5/2007 | Toshikage et al. | |
| 8,761,580 B2 | 6/2014 | Gausereide | |
| 9,135,410 B2 | 9/2015 | Tardelli et al. | |
| 9,251,320 B2 * | 2/2016 | Lee | G06F 21/10 |
| 9,571,713 B2 | 2/2017 | Basson et al. | |
| 9,691,090 B1 | 6/2017 | Barday | |
| 10,424,406 B2 * | 9/2019 | Jafer | G06F 21/6254 |
| 2002/0052933 A1 | 5/2002 | Leonhard et al. | |
| 2002/0062290 A1 | 5/2002 | Ricci | |
| 2003/0005428 A1 | 1/2003 | Roman | |
| 2006/0236344 A1 | 10/2006 | Brain et al. | |
| 2006/0242681 A1 | 10/2006 | Brain et al. | |
| 2009/0054157 A1 | 2/2009 | Hamilton, II et al. | |

(Continued)

FOREIGN PATENT DOCUMENTS

GB    2476027 A    6/2011

OTHER PUBLICATIONS

Johnson, Justin, et al. "Image retrieval using scene graphs." In IEEE Conference on Computer Vision and Pattern Recognition (CVPR), 2015, 1-11.

(Continued)

*Primary Examiner* — Ellen Tran
(74) *Attorney, Agent, or Firm* — Patterson + Sheridan, LLP

(57) ABSTRACT

A system for providing permissioned images in media transactions is described. The system processes images in an image set for a media transaction to identify the image owner and other persons depicted in the image and determines use permissions for the images. Various images in the image set are processed to remove or anonymize various persons in order to meet use conditions. The processed images are compiled and provided to an entity requesting the image set.

20 Claims, 7 Drawing Sheets

(56) References Cited

U.S. PATENT DOCUMENTS

| | | |
|---|---|---|
| 2009/0217343 A1 | 8/2009 | Bellwood et al. |
| 2010/0030746 A1 | 2/2010 | Steelberg et al. |
| 2012/0123875 A1* | 5/2012 | Svendsen ........... G06Q 30/0261 |
| | | 705/14.72 |
| 2012/0250951 A1 | 10/2012 | Chen |
| 2013/0011068 A1 | 1/2013 | Albouyeh et al. |
| 2014/0156044 A1 | 6/2014 | Boss et al. |
| 2015/0296170 A1 | 10/2015 | Farrell et al. |

OTHER PUBLICATIONS

Karras, Tero, et al. "Progressive Growing of GANs for Improved Quality, Stability, and Variation". In International Conference on Learning Representations (ICLR), 2018, pp. 1-26.

Ren, Zhongzheng, Yong Jae Lee, and Michael S. Ryoo. "Learning to Anonymize Faces for Privacy Preserving Action Detection". In European Conference on Computer Vision (ECCV), 2018 pp. 1-17.

Shen, Wei, and Rujie Liu. "Learning residual images for face attribute manipulation." In IEEE Conference on Computer Vision and Pattern Recognition (CVPR), 2017 pp. 1-9.

Zhou, Wengang, Houqiang Li, and Qi Tian. "Recent Advance in Content-based Image Retrieval: A Literature Survey." arXiv preprint arXiv:1706.06064 (2017) pp. 1-22.

* cited by examiner

US 11,768,923 B2

MEDIA TRANSACTIONS CONSENT MANAGEMENT

BACKGROUND

The present invention relates to consent and permission for image media usage, and more specifically, to facilitating image transactions while ensuring that interested parties have given the proper consent and use permissions for the media transaction. With both the increase in public attitudes toward the control of a person's image and likeness in digital media as well as the passage of new privacy laws around the world, the control of a person's image in both pictures the individual has taken and photos in which they are captured has become an increasing concern for entities/companies that store images and other media and facilitate transactions of the stored media.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One embodiment includes a method for permissioned image compilation. The method includes receiving an image data request from a requesting entity, selecting, from an image database and based on the image data request, a preliminary set of image data, and determining one or more image use permissions for the preliminary set of image data. The method also includes altering one or images in the preliminary set of image data based on the one or more image use permissions to produce a permissioned set of image data, and compiling a final set of image data from the permissioned set of image data and from the preliminary set of image data based on the one or more image use permissions, and providing the final set of image data to the requesting entity. Other embodiments of this aspect include corresponding computer systems, apparatus, and computer programs recorded on one or more computer storage devices, each configured to perform the actions of the methods.

One example embodiment includes a system for permissioned image compilation. The system including one or more computer processors, and a memory containing a program which when executed by the computer processors performs an operation. The operation includes receiving an image data request from a requesting entity, selecting, from an image database and based on the image data request, a preliminary set of image data, and determining one or more image use permissions for the preliminary set of image data. The operation also includes altering one or more images in the preliminary set of image data based on the one or more image use permissions to produce a permissioned set of image data, compiling a final set of image data from the permissioned set of image data and from the preliminary set of image data based on the one or more image use permissions, and providing the final set of image data to the requesting entity.

One example embodiment includes a computer program product for permissioned image compilation. The computer program product includes a computer-readable storage medium having computer-readable program code embodied therewith, the computer-readable program code executable by one or more computer processors to perform an operation. The operation includes receiving an image data request from a requesting entity, selecting, from an image database and based on the image data request, a preliminary set of image data, and determining one or more image use permissions for the preliminary set of image data. The operation also includes altering one or images in the preliminary set of image data based on the one or more image use permissions to produce a permissioned set of image data, compiling a final set of image data from the permissioned set of image data and from the preliminary set of image data based on the one or more image use permissions, and providing the final set of image data to the requesting entity.

DETAILED DESCRIPTION

With the establishment of General Data Protection Regulation (GDPR) in the European Union (as well as other similar legislation rules in other countries), transactions involving media data (e.g., photos, video, audio) are increasingly more complex from a legal and ethical perspective. For example, individuals whose likeness (image, voice, etc.) is being displayed in an image are given rights and protection over the use of the likeness. The guidelines used by GDPR include at least: the right to be informed (e.g., clear understanding about the context of how the photos are being used), the right to access (e.g., individuals have the right to access their personal data on request and receive confirmation how this data is being used), the right to receive a copy of the personal data about the individual, the right to erasure (e.g., individuals have the right to request images and other media be removed from websites, social media and future versions of printed materials, etc.), among others.

This new set of rules and the increasing expectations of consumers to control their personal data introduces significant challenges for the use and transaction of media files between entities, such as between companies. For example, a company does not have the right to provide media from its database to others without consent from individuals being displayed in the media. In one example, company A has some media content "M" displaying individuals X, Y, and Z. If company B wishes to acquire and use the content M for some other task, company B first contacts company A (to purchase/license the image data) as well as individuals X, Y, and Z to request for their authorization for company B's intended use. While this approach may function well for individual media files, it becomes intractable when large amounts of files and data are involved. Moreover, from the perspective of individuals (e.g., X, Y, and Z), the number of undesired incoming authorization requests may grow considerably over time, making the transaction process untenable.

The systems and methods described herein provide for efficient media transactions (e.g., image data transaction) between entities. The system also ensures that protections for individuals in the media are followed and that proper use permissions are granted by the interested parties by ensuring that those individual whose likeness is included in the image and the image owners approve and provide permission for the use of the image and likeness of the individuals during a compilation of an image data set.

Figure 1:
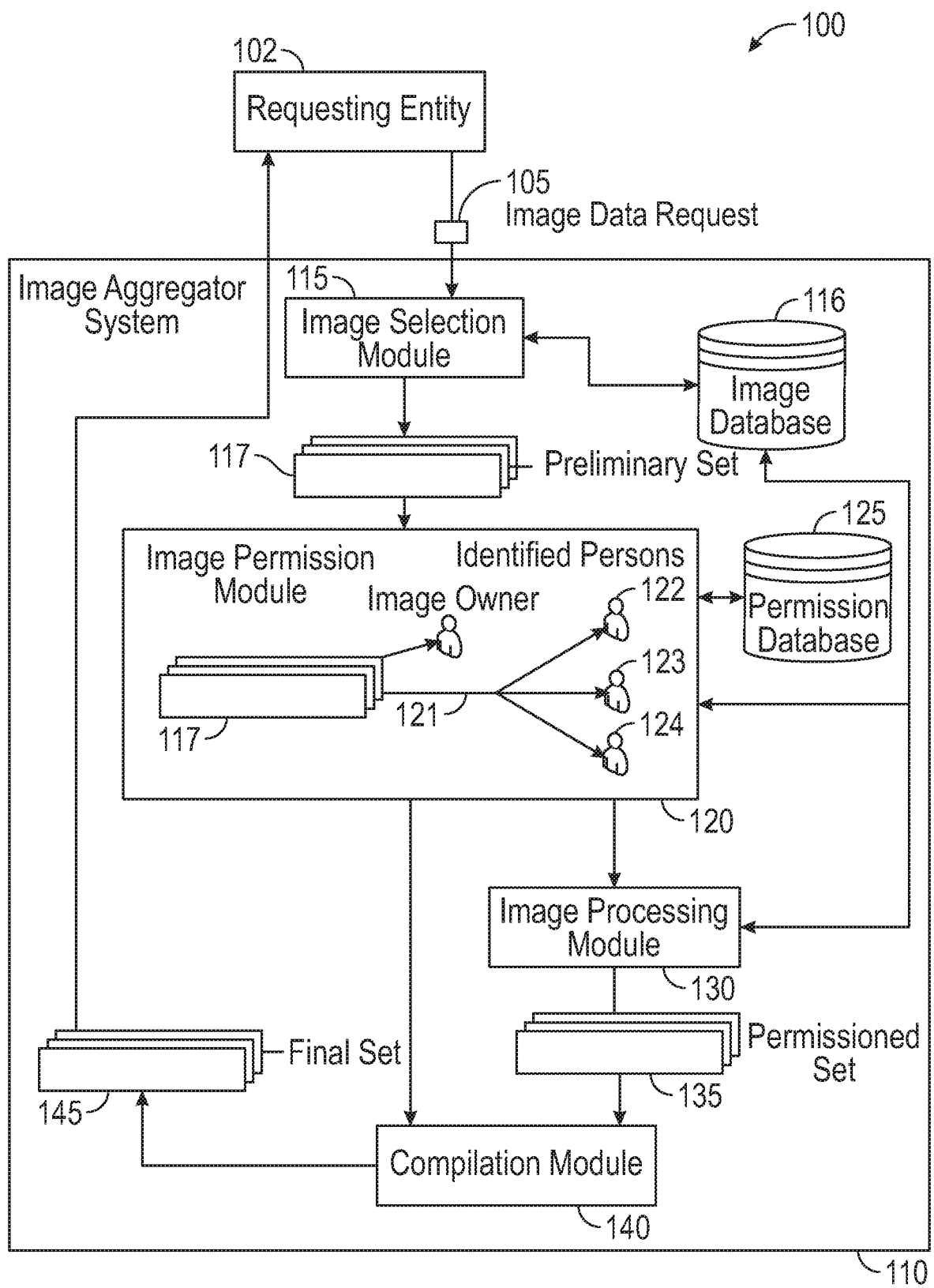
FIG. 1 illustrates an example image aggregation and permission system, according to one embodiment.

FIG. 1 illustrates an example image aggregation and permission system, according to one embodiment. The system 100 includes a requesting entity 102 and an image aggregator system 110. In some examples, the requesting entity 102 is an entity that requests image data from the image aggregator system via an image data request 105. The requesting entity may be any entity that uses and/or processes image data. For example, a company using images for commercial purposes such as advertisements etc., requests relevant images and other types of datasets from the image aggregator system 110. The requesting entity 102 may also include other types of commercial and non-commercial entities (e.g., research and educational entities) using image data for machine learning and training processes, such as image/facial recognition training, etc.

In some examples, the image aggregator system 110 includes an entity that aggregates image data such as an image repository system for photographers, a social network providing image storage to users, and/or any other entity that controls/maintains access to an image database. Upon receipt of the image data request 105 at the image aggregator system 110, the image selection module 115 selects a preliminary set 117 from an image database 116. In some examples, the image data request 105 includes one or more content conditions and/or the requesting entity 102 also transmits content conditions which are received by the image aggregator system 110.

In some examples, the content conditions specify the types of data the requesting entity 102 is requesting and the intended uses for the image data. For example, the content conditions may specify that the requested image data is for a large dataset for machine learning training, individual images for a commercial user, and/or other image conditions/uses. In some examples, the content conditions also include information relevant to the content presented in the image data. For example, the content conditions may include specific information related to the image data being requested, including the size of images, the number of people in the images, etc.

In some examples, the content conditions include abstract queries such as "man holding fish on boat," or may include specific guidelines that are usable by the image selection module 115. The image selection module 115 uses the image data request 105, the content conditions, and the image database 116, to compile/select the preliminary set 117 matching the content conditions specified by the requesting entity 102. In some examples, the image selection module 115 searches the image database 116 according to factors contained in the content conditions including keywords found in abstract queries (e.g., queries provided via text, audio, image, video, etc.), examples, sketches, color layout, and/or a combination of these factors to gather/select/compile the preliminary set of image data, preliminary set 117, from the image database 116. In some examples, the preliminary set 117 may also include images that match the content conditions and have been preapproved with image use permissions. For example, the images that have been previously approved by the image owners and/or individuals identified within the image for the use by the requesting entity 102 and/or for a similar uses are compiled into the preliminary set 117.

The preliminary set 117 is provided to the image permission module 120 which determines image use permissions for the preliminary set of image data using the permission database and/or requesting permissions from the image owner 121 and any identified person in the preliminary set 117 such as identified persons 122-124. For previously approved images in the preliminary set 117, the image permission module 120 passes the images to the compilation module 140.

In some examples described herein, the image permission module processes the images in the preliminary set 117 using facial recognition, other image processing techniques, and/or image metadata to identify the image owner 121 and the various identified persons 122-124. The identification of the various individuals is used to gain permission to use the image and/or the identified person's likeness. If the permission information is not stored in the permission database 125 and/or in metadata associated with the image, the image owner 121 and the identified persons 122-124 are contacted as described herein in order to determine and/or acquire permission to use the image and/or personal likeness. In some examples, once the permission is determined and/or acquired that information is then stored in permission database 125.

In some examples, images in the preliminary set 117 may be fully permissioned for use by the image owner and the associated identified persons in the image and the image is compiled by the compilation module 140 in the final set 145. For example, when the image permission module 120 determines via the permission database 125 and/or by contacting the image owner 121 and identified persons 122-124 that the image may be used without modification or further processing, the image permission module provides the image in the preliminary set 117 to the compilation module 140. The image fully permissioned image may also be stored in the image database 116 with an indication that the image is preapproved for use and/or a subset uses.

Figure 2A:
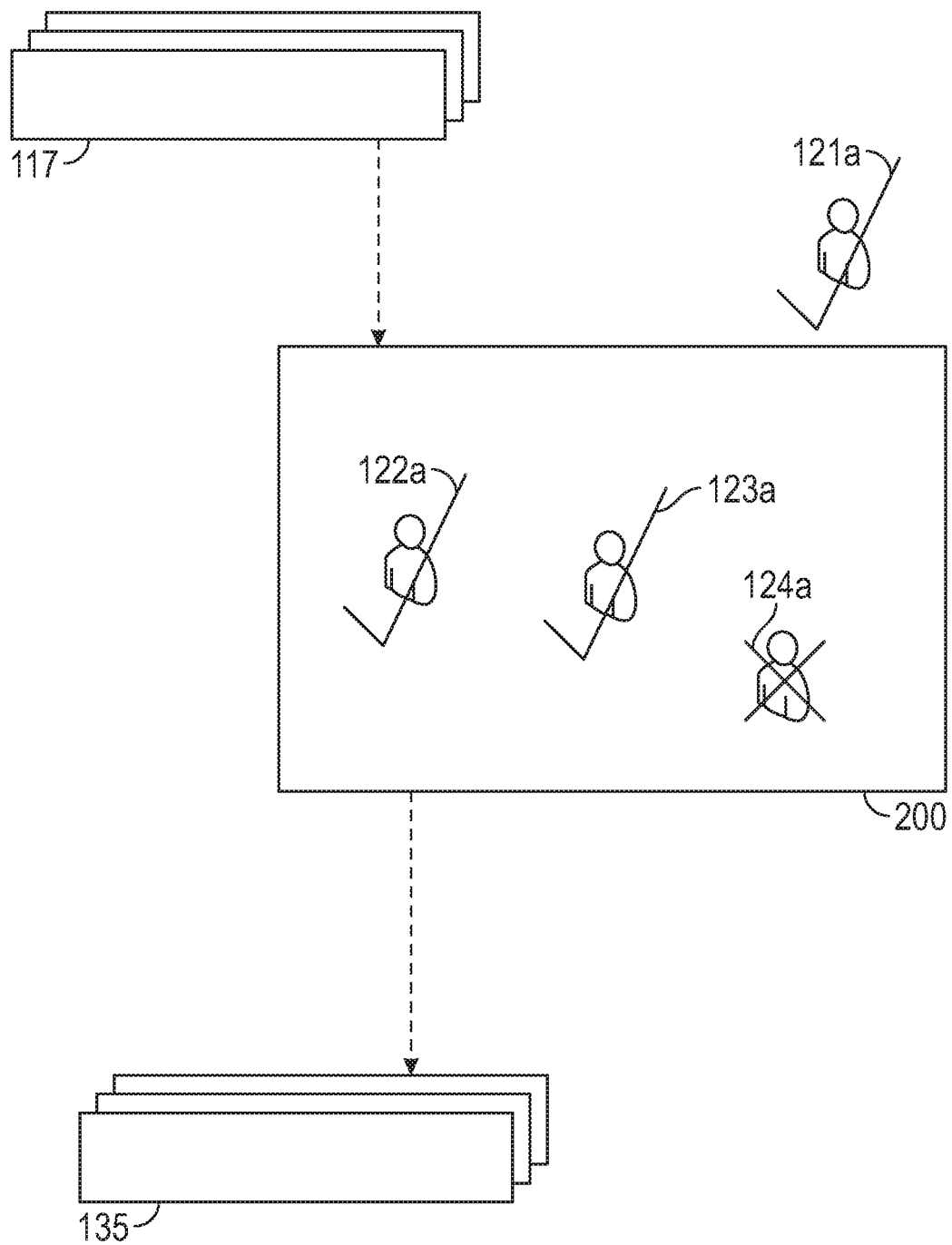
FIGS. 2A-2F illustrate example image alterations, according to embodiments described herein.

In some examples, images in the preliminary set 117 are not fully permissioned and are either removed from the preliminary set 117 or are processed such that the images may be used by the requesting entity 102. For example, as shown in FIG. 2A, the identified persons 122a and 123a and the owner 121a provide permission for image use via the image permission module 120, but the identified person 124a denies use permission or cannot be contacted. Thus, the image/likeness of identified person 124a should be removed from the image 200 before the image 200 can be added to the permissioned set 135. In these cases, the image processing module 130 processes and/or alters the images that have been indicated to include some level of permission to modify the images in order to create a permissioned image in the permissioned set 135, if the requesting entity 102 conditions accepts image modifications (if the requesting entity does not accept modified images, the image is removed from the preliminary set).

In some embodiments, the image processing module 130 also stores the specific processing steps performed, filters and settings used, identity of the processing entity, and/or the identity of the requesting entity in the permission database 125 and/or embeds the information into the image file(s) as metadata along with the identified permissions. In some cases, this information may be additionally be digitally signed by the processing entity and used in conjunction with cameras that securely identify who captured the original picture and the original permissions obtained, if any. In this way, these embodiments provide for auditability throughout life of the image.

Figure 2B:
Figure 2C:
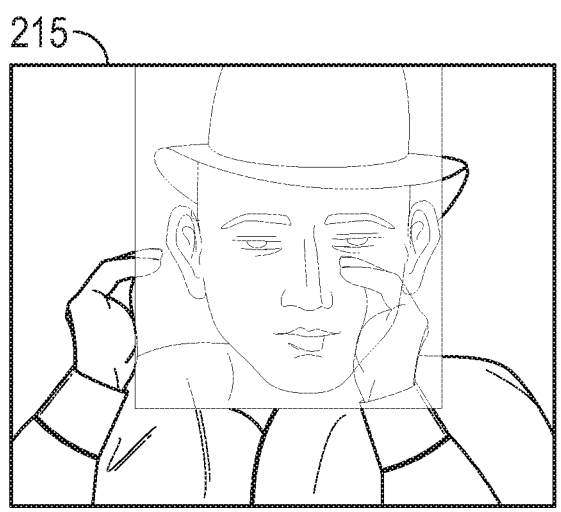
Figure 2D:
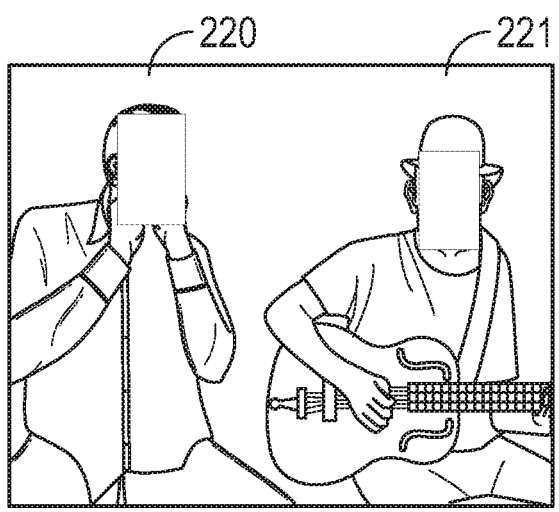

For example, as shown in FIG. 2B, the image processing module 130 applies image processing to anonymize features of the identified person when the identified permission requires anonymization for image use or has not provided an image use permission. For example, the identified person 221a may be anonymized into anonymous person 211b. In FIG. 2D the anonymized person 215 is anonymized by obscuring the face of the person in the image and likewise in FIG. 2D the anonymized persons 220 and 221 are anonymized by having their faces covered.

Figure 2E:
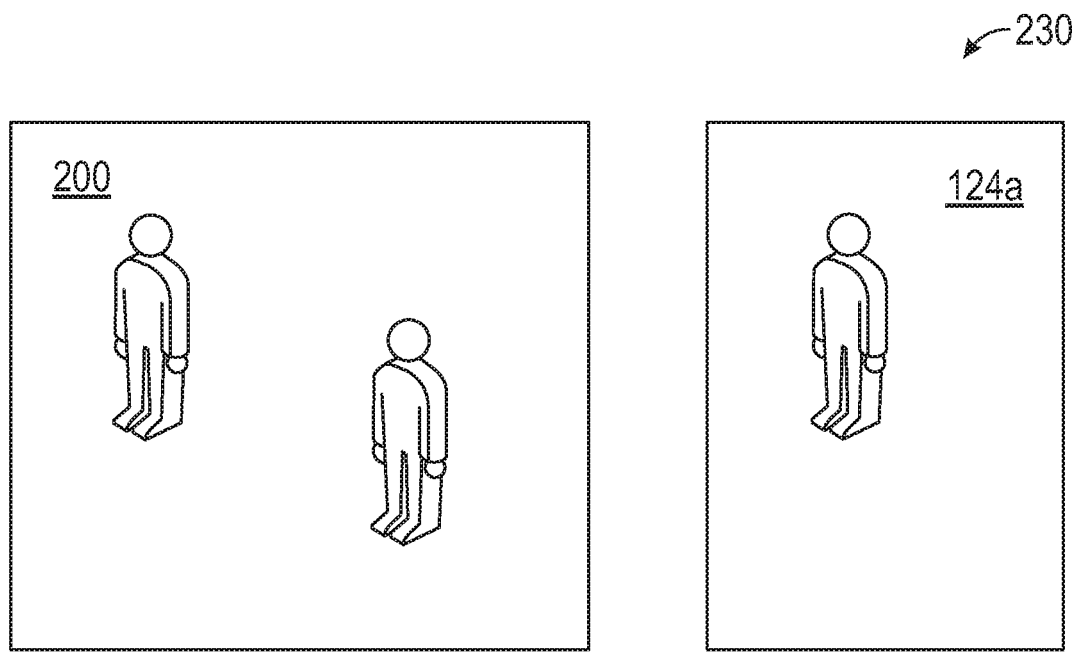
Figure 2F:
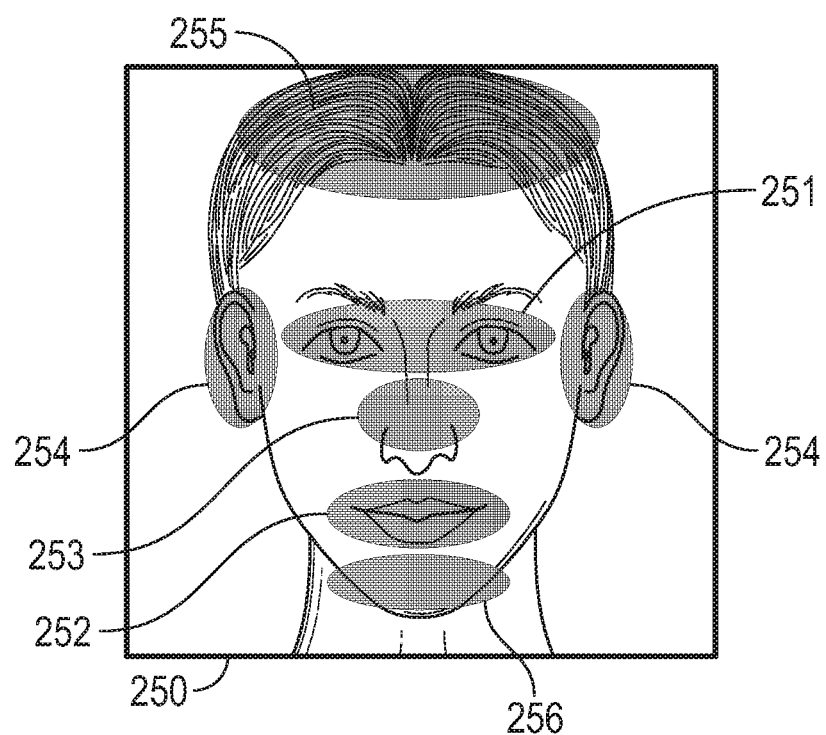

In FIG. 2E, the identified person 124a is removed or cropped from the image 200 in the cropped section 230 to remove the individual that has not granted permission. In some examples, the cropped or removed identified person may be replaced by a generated image. For example, in FIG. 2F, the generated anonymous person 250 includes the facial features 251-256, where each of the facial features 251-256 is generated/created by the image processing module 130 to create an anonymous person for inclusion in the image 200. In some examples, the generated person 250 replaces an identified person that has not given a use permission. Example methods for generating realistic faces include but are not limited to Generative Adversarial Networks (GANs).

Returning back to FIG. 1, once the image processing module 130 processes/alters an image for inclusion in the permissioned set 135, the image processing module 130 also stores the permitted image in the image database 116 with an indication that the image is preapproved for use and/or a subset uses. The compilation module 140 compiles the images both directly from the image permission module 120 and the preliminary set 117 as well as the image processing module 130 and the permissioned set 135 into a final set 145. The final set 145 includes the images that match the requirements from the image data request 105 and can be used by the requesting entity 102 for the desired and permissioned purposes.

Figure 3:
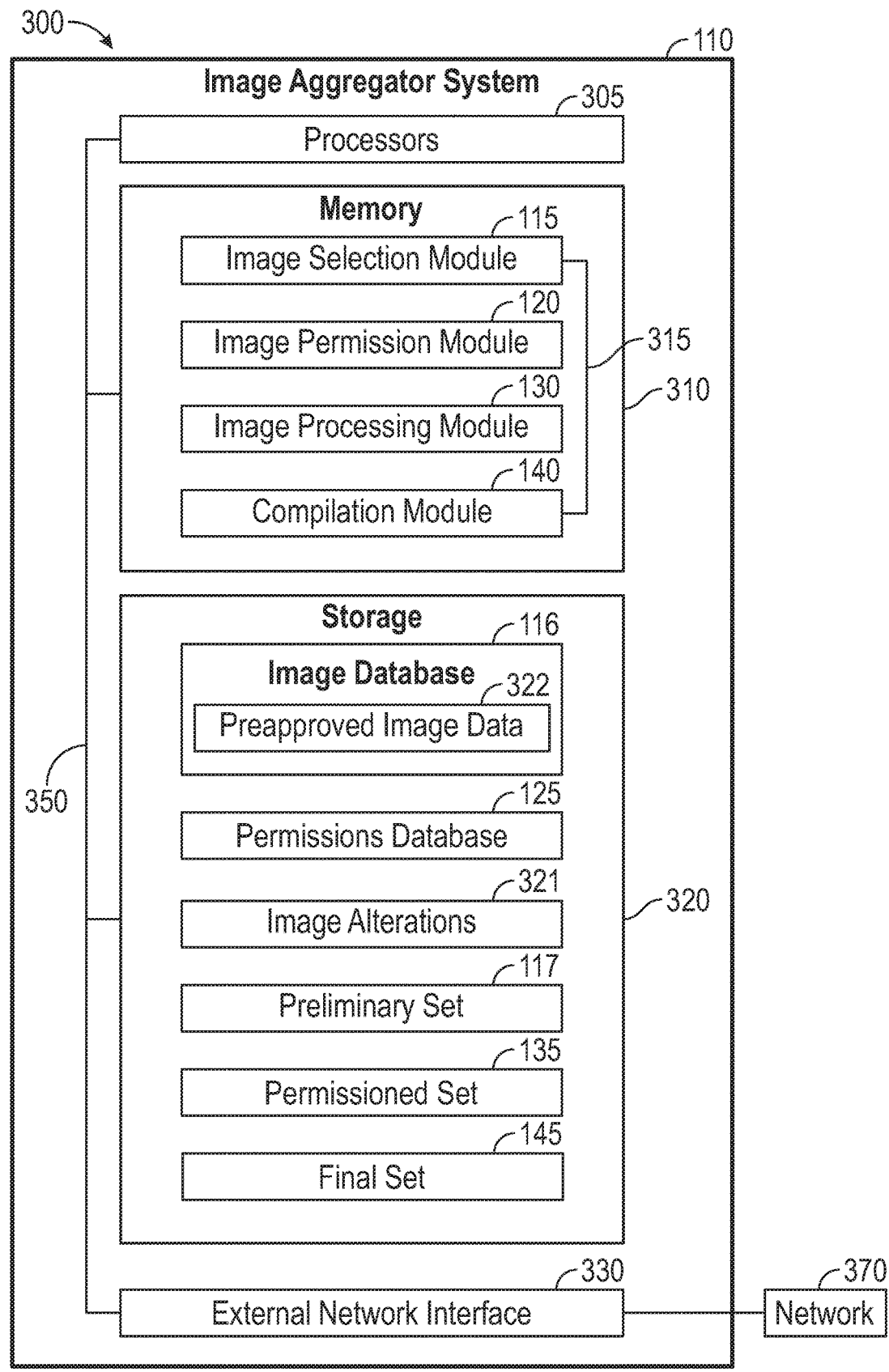
FIG. 3 illustrates a block diagram of an image aggregator system, according to one embodiment.

FIG. 3 illustrates a block diagram of an image aggregator system, according to one embodiment. The arrangement 300 may include a computer embodied as image aggregator system 110 and configured to perform the methods described herein. The image aggregator system 110 is shown in the form of a general-purpose computing device. The components of image aggregator system 110 may include, but are not limited to, one or more processors or processing units 305, a system memory 310, a storage system 320, network interface 330, and a bus 350 that couples various system components including the system memory 310 and storage system 320 to processors 305 along with the network interface 330 and various input/output components and a network 370. In other embodiments, arrangement 300 is distributed and includes a plurality of discrete computing devices that are connected through wired or wireless networking.

Bus 350 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Image aggregator system 110 typically includes a variety of computer system readable media. Such media may be any available media that is accessible by image aggregator system 110, and it includes both volatile and non-volatile media, removable and non-removable media.

System memory 310 can include computer system readable media in the form of volatile memory, such as random access memory (RAM) and/or cache memory. Image aggregator system 110 may further include other removable/non-removable, volatile/non-volatile computer system storage media. In some examples storage system 320 may be included as part of memory 310 and may typically provide a non-volatile memory for the networked computing devices, and may include one or more different storage elements such as Flash memory, a hard disk drive, a solid state drive, an optical storage device, and/or a magnetic storage device. For example, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. Storage 320 may include media for storing The image database 116 (including preapproved image data 322), permissions database 125, image alterations 321, preliminary set 117, permissioned set 135, and final set 145. The information stored in storage system 320 may be updated and accessed by the program modules 315 described herein.

Memory 310 may include a plurality of program modules 315 for performing various functions related to media aggregation and transactions described herein. The modules 315 generally include program code that is executable by one or more of the processors 305. As shown, modules 315 include the various modules discussed in relation to FIG. 1 including image selection module 115, image permission module 120, image processing module 130, and compilation module 140. The modules 315 may also interact with each other and storage system 320 to perform certain functions as described herein.

Figure 4:
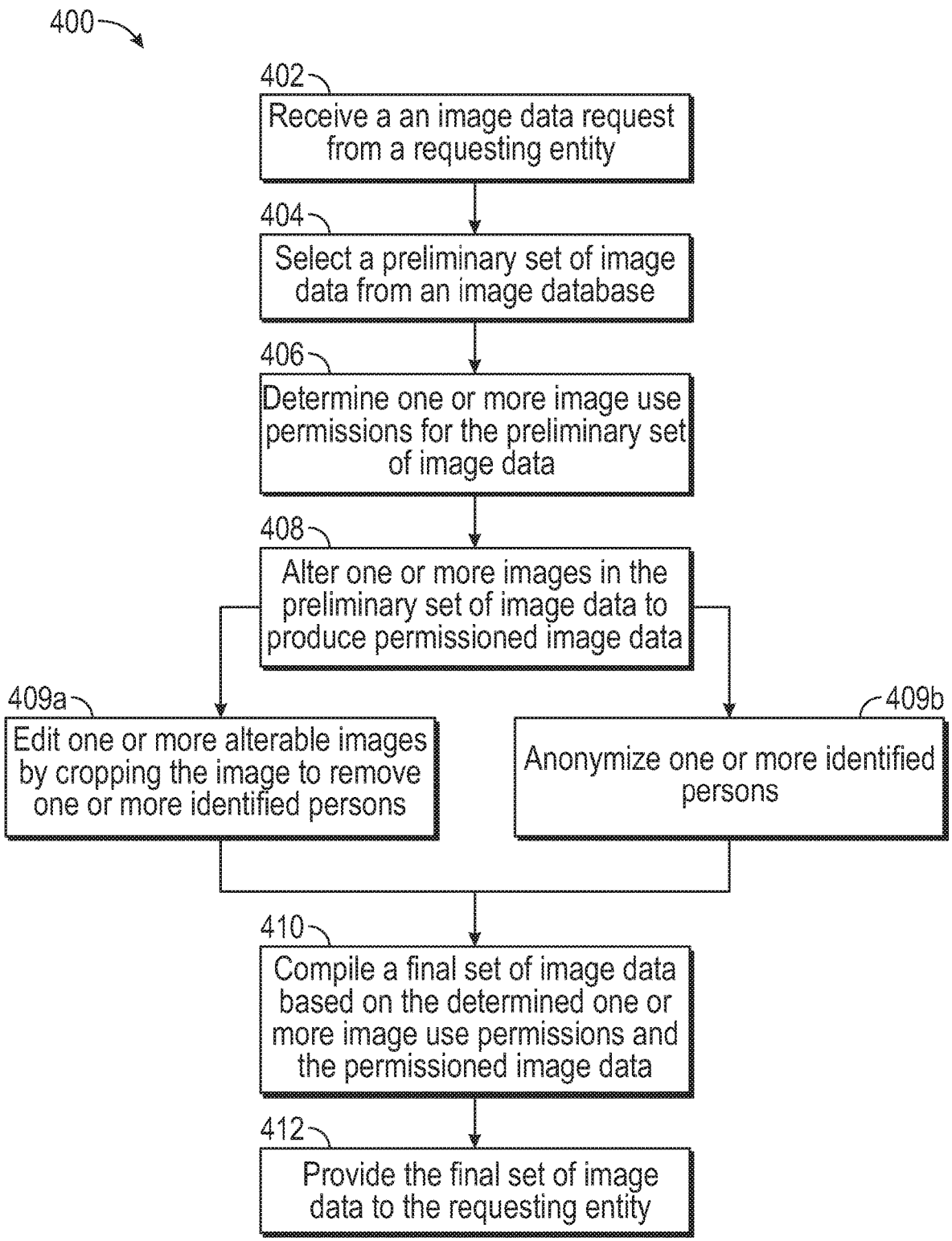
FIG. 4 illustrates a method for permissioned image compilation, according to embodiments described herein.

FIG. 4 illustrates a method for image permission, according to embodiments described herein. Method 400 begins at block 402 where the image selection module 311 receives an image data request from a requesting entity. For example, as shown in FIG. 1, the requesting entity 102 requests an image data set from the image aggregator system 110. In some examples, the image data request includes one or more content conditions and/or the requesting entity 102 also transmits content conditions which are received by the image aggregator system 110. In some examples, the content conditions specify the types of data the requesting entity 102 is requesting and/or the intended uses for the image data at the requesting entity. For example, the content conditions may specify that the request image data is for a large dataset for machine learning training, individual images for commercial use, and/or other image conditions. In some examples, the content conditions also include information relevant to the content presented in the image data. For example, the content conditions may include specific information related to the image data requested, including the size of images, the number of people in the images, etc. In some examples, the content condition may specify whether image modification methods such as described herein are accepted by the requesting entity 102 or if the original image is required. In some examples, the content conditions include abstract queries and/or keywords for use in selection of the image data. In some examples, the image selection module 115 parses the image data request and content conditions in order to determine which image data to select from the image database 116.

At block 404, the image selection module 115 selects, based on the image data request, a preliminary set of image data from an image database. For example, the image selection module 115 uses the content conditions to search and select images and image data from the image database 116. In some examples, the image selection module 115 searches the image database according to parsed information from the content conditions including keywords, examples, sketches, color layout, and/or a combination of these factors to gather/select/compile the preliminary set of image data, preliminary set 117.

In some examples, the preliminary set 117 includes images that have been preapproved with image use permissions. For example, the images have been previously approved by the image owners (e.g., image owner 121) and/or individuals identified within the image (identified persons 122-124) for the use by the requesting entity 102 and/or for a similar use. For example, an image in the image database may indicate that non-commercial use is allowed and/or commercial use in not allowed, thus, when the image data request 105 indicates the use is commercial, the will not be selected. In some examples, the images in the preliminary image data include images where the permissions of the image owner and/or the individuals in the images are not known, but otherwise match the content conditions. These images are selected by the image selection module and permissioned as described herein.

At block 406, the image permission module 120, determines one or more image use permissions for the preliminary set of image data. In some examples, the image use permissions for both the owner of the image (e.g., a copyright holder of the image) and for the individuals depicted in the image is be determined before the image can be provided to the requesting entity 102.

Figure 5:
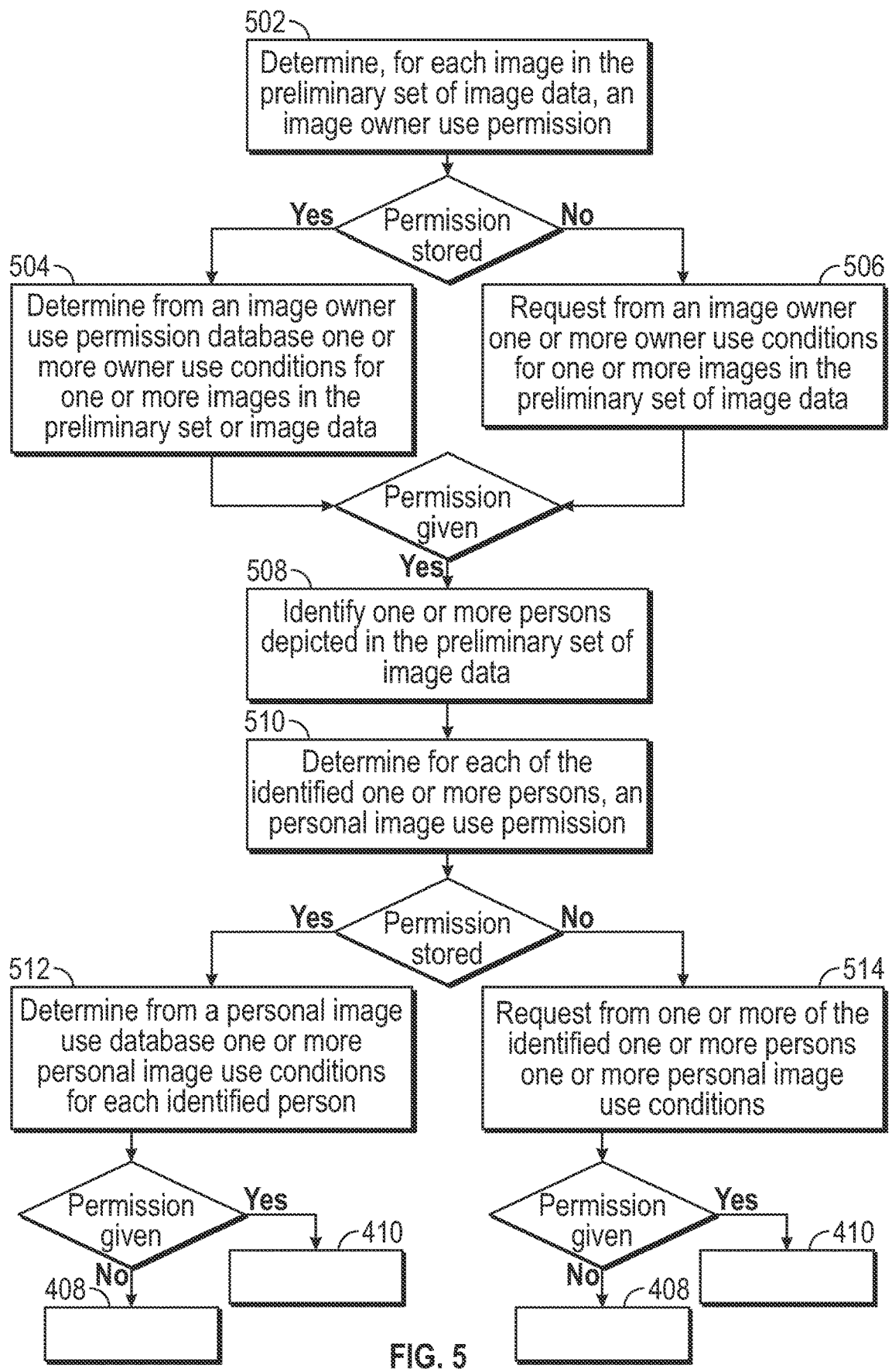
FIG. 5 illustrates a method for image permissioning, according to one embodiment.

As described in relation to method 500 in FIG. 5, the image permission module 120 determines, for each image in the preliminary set of image data, an image owner use permission. Referring back to FIG. 2A, in some examples, the image owner 121a includes an individual or entity that owns the image. Image ownership may include owning the copyright of the image, a license to use the image, etc. In some examples, the image owner 121a is an individual user that uploads personal images to the image aggregator, such as loading images to a social networking website, etc. In some examples, the image owner is an entity other than an individual, where the entity (e.g., an organization, corporation, etc.) owns the image, the copyright to the image, license/exclusive license to the image, etc.

In some examples, the image aggregator requests permission from the image owner 121a when the image aggregator acquires the image and/or stores the image in the image database 116. For example, the image owner 121a may be prompted for use permissions when uploading image data to the image aggregator system 110. In other examples, as the image permission module 120 determines/acquires the use permission as described herein. When the user permission is received, the image aggregator system 110 stores the use permission information in the permission database 125.

When the image owner use permission is known or stored in the permission database 125, method 500 proceeds to block 504, where the image permission module determines from an image owner use permission database one or more owner use conditions for one or more images in the preliminary set of image data. For example, for the image 200 in the preliminary set 117, the image owner 121a is identified and the use permission is determined from the permission database 125. In some examples, the owner use conditions include a general use permission, where the image may be used for any purpose, may be altered by the image aggregator system 110, and/or provided to any requesting entity. Other owner use conditions include a non-commercial use permission, a research use permission, an anonymization user permission, a use restriction permission and/or any combination of these conditions and others specified by the user. When the image aggregator system 110 cannot determine the use permissions from the permission database 125, the image permission module 120 requests the use permission from the image owner 121a.

At block 506, the image permission module 312 requests from an image owner one or more owner use conditions for one or more images in the preliminary set of image data. For example, the image permission module 120 transmits, via the network 370 or other methods, a permission request to the image owner 121a requesting permission to use the image according to the use conditions selected by the image owner 121a. In some examples, as the image aggregator system 110 requests use permissions from the image owner, the image aggregator system 110 stores the use permissions in the permission database 125 for future use.

Once the system 120 determines that the image owner 121a approves use of the image, in on embodiment, the permission of the individuals depicted in the image is also be determined and/or acquired. In some examples, if the image owner cannot be determined and/or the image owner 121a requests the image data (e.g., image 200) be removed from the image database 116. The image aggregator system 110 marks the image 200 and associated image data such that it will not be selected into the preliminary set 117 and/or removes the image from the image database 116.

At block 508, the image permission module 120 identifies one or more persons depicted in the preliminary set of image data. In some examples, the persons/individuals depicted in the preliminary set of image data may be tagged with an identification. For example, in a social media network, the persons 121a-124a in an image 200, are tagged by the image owner 121a or another entity when the image 200 is uploaded to the image aggregator system. In another example, image permission module 120 processes the image with facial recognition and other processes to determine an identity of each person in the preliminary set of image data. Once the persons in the image data are identified, the image permission module 312 determines for each of the identified one or more persons, a personal image use permission at block 510 and as described in relation to blocks 512 and 514.

In some examples, when a person depicted in an image cannot be identified, the image permission module 120 sets the permission for the unidentifiable person as not granted and/or sets that the unidentified person should be anonymized or removed from the image.

For the identified one or more persons, at block 512, the image permission module 120 determines from a personal image use database one or more personal image use conditions for each identified person. For example, if an individual such as person 122a has previously granted or rejected image use permission, the image permission module 120 determines from the permission database 125 that the individual has granted or rejected personal image use.

When the individual is known, but a personal image use permission is not known, the individual is contacted for user permission.

For example, when the personal image use permissions for persons 123a and 124a are not known, the image permission module 120 requests from one or more of the identified one or more persons one or more personal image use conditions at block 514. In some examples, the image permission module 120 requests, via the network 370, a generic user permission. In some examples, the image permission module 120 requests permission for specific uses and conditions (e.g., commercial use, large data use, etc.). The one or more personal image use conditions may include a general use permission, a non-commercial use permission, a research use permission, an anonymization use permission, and/or a use restriction permission.

Returning back to FIG. 4, at block 408, the image processing module 313, alters one or more images in the preliminary set of image data based on the one or more image use permissions to produce permissioned image data. For example, at block 409a, the image processing module 313, edits one or more of the alterable images by cropping the image to remove one or more identified persons in the image that have not provided permission for personal image use. For example, as shown in FIG. 2E, the image 200 is cropped by removing the section 230, such that the identified person 124a is removed from the image 200.

At block 409b, the image processing module 313, anonymizes one or more identified persons in the image that have not provided permission for personal image use. For example, the image processing module 313 applies anonymization features stored in image alterations 321 and described in FIGS. 2B-2D and FIG. 2G to remove an identified person's likeness from the image. In some examples, the image may be both cropped and anonymized as described herein. In some examples, the image processing module 313 also collects the identified permissions, the processing steps performed, filters and settings used, and/or the identity of the requesting entity, digitally signs the collected information, and stores the information in the permission database 125 and/or embeds it as metadata in the image file.

At block 410, the compilation module 140 compiles a final set of image data based on the one or more image use permissions and the permissioned image data. In some examples, the compilation module 140 selects one or more permitted images from the permissioned set 135 and/or the images provided from the image permission module 120 for the final set of image data, final set 145. As described in relation to FIG. 1, the permitted images in the permissioned set 135 include images where use of the image (including anonymized images) is permitted by the image owner and personal image use is permitted by each identified person in the permitted image of the one or more permitted images in the permissioned set. For example, the compilation module compiles the images that are approved by the image owner and identified persons from the image permission module 120 into the final set 145. The compilation module 140 also compiles the images from the permissioned set 135 that are processed by the image processing module according to the various use permissions from the image owner 121 and identified persons 122-124.

The compilation module 140 also removes one or more non-permitted images from further processing. In some examples, non-permitted images include images where use of the image is not known and/or not permitted by the image owner or by one or more of the identified persons in the non-permitted images.

At block 412, the image aggregator system 110 provides the final set of image data to the requesting entity. For example, the image aggregator system 110 provides the final set 145 to the requesting entity 102 to complete the image data request. In some examples, the image aggregator system 110 provides the compiled set as an independent transferable set of image data. In some examples, the final set 145 includes pointers or other identification to the images stored in the image database 116, where the requesting entity 102 may access or acquire the images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., image aggregator system 110) or related data available in the cloud. For example, the image aggregator system could execute on a computing system in the cloud and compile and permission images via a cloud computing system. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for permissioned image compilation comprising:
   receiving an image data request from a requesting entity, wherein the image data request comprises content conditions specifying one or more types of requested image data and an intended use for the requested image data;
   selecting, from an image database, a preliminary set of image data, wherein the preliminary set of image data is selected based on the one or more types of requested image data and the intended use for the requested image data;
   determining one or more image use permissions for the preliminary set of image data;
   altering one or more images in the preliminary set of image data based on the one or more image use permissions to produce a permissioned set of image data,
      wherein the permission set of image data comprises a plurality of permissioned images,
      wherein each permissioned image of the plurality of permissioned images comprises an image use permission from an image owner entity and a personal likeness use permission from each identified person in the permissioned image,
      wherein the image owner entity comprises a copyright owner for a respective image of the plurality of permissioned images,
      wherein a personal likeness use permission for an identified person of the each identified person comprises a permission to use a depiction of the identified person in the permissioned set of image data, and
      wherein the image owner entity comprises a different entity from at least one identified person in the permissioned image;
   compiling a final set of image data from the permissioned set of image data and from the preliminary set of image data based on the one or more image use permissions; and
   providing the final set of image data to the requesting entity.

2. The method of claim 1, wherein the image data request comprises one or more content conditions and wherein selecting the preliminary set of image data further comprises:
   selecting one or more images for the preliminary set of image data according to the one or more content conditions.

3. The method of claim 1, determining one or more image use permissions for the preliminary set of image data comprises:
   determining, for each image in the preliminary set of image data, an image owner use permission;
   identifying one or more persons depicted in the preliminary set of image data; and
   determining for each of the identified one or more persons, a personal likeness use permission.

4. The method of claim 3, wherein determining the image owner use permission comprises one or more of:
   determining from an image owner use permission database one or more owner use conditions for one or more images in the preliminary set of image data; and
   requesting from an image owner entity one or more owner use conditions for one or more images in the preliminary set of image data; and
   wherein determining for each of the identified one or more persons the personal likeness use permission comprises one or more of:
   determining from a personal likeness use database one or more personal likeness image use conditions for each identified person; and
   requesting from one or more of the identified one or more persons one or more personal likeness image use conditions.

5. The method of claim 4, wherein the one or more owner use conditions and the one or more personal likeness use conditions comprise one or more of:
   a general use permission;
   a non-commercial use permission;
   a research use permission;
   an anonymization user permission; and
   a use restriction permission.

6. The method of claim 3, wherein altering one or images in the preliminary set of image data comprises one or more of:
   editing one or more of the alterable images by cropping the image to remove one or more identified persons in the image that have not provided permission for personal likeness use; and
   anonymizing one or more identified persons in the image that have not provided permission for personal likeness use.

7. The method of claim 3, wherein compiling the final set of image data comprises one or more of:
   selecting one or more permitted images for the final set of image data, wherein the permitted images comprise images where use of the image is permitted by the image owner entity and personal likeness image use is permitted by each identified person in a permitted image of the one or more permitted images; and
   removing one or more non-permitted images from further processing, wherein the non-permitted images where use of the image is not permitted by the image owner entity or by one or more of the identified persons in the non-permitted images.

8. The method of claim 1, wherein compiling the final set of image data comprises:
   identifying one or more properties of the image data in the preliminary set of image data; and
   selecting, using the one or more properties, one or more pre-approved images for the final set of image data, wherein the one or more pre-approved images comprise images where use of the image is known to be permitted by an image owner entity and personal likeness use is known to be permitted by each identified person in the permitted image.

9. A system for permissioned image compilation comprising:
   a computer processor; and a memory containing a program which when executed by the computer processor performs an operation comprising:
receiving an image data request from a requesting entity, wherein the image data request comprises content conditions specifying one or more types of requested image data and an intended use for the requested image data;
selecting, from an image database and based on the image data request, a preliminary set of image data, wherein the preliminary set of image data is selected based on the one or more types of requested image data and the intended use for the requested image data;
determining one or more image use permissions for the preliminary set of image data;
altering one or more images in the preliminary set of image data based on the one or more image use permissions to produce a permissioned set of image data,
wherein the permission set of image data comprises a plurality of permissioned images,
wherein each permissioned image of the plurality of permissioned images comprises an image use permission from an image owner entity and a personal likeness use permission from each identified person in the permissioned image,
wherein the image owner entity comprises a copyright owner for a respective image of the plurality of permissioned images,
wherein a personal likeness use permission for an identified person of the each identified person comprises a permission to use a depiction of the identified person in the permissioned set of image data, and
wherein the image owner entity comprises a different entity from at least one identified person in the permissioned image;
compiling a final set of image data from the permissioned set of image data and from the preliminary set of image data based on the one or more image use permissions; and
providing the final set of image data to the requesting entity.

10. The system of claim 9, determining one or more image use permissions for the preliminary set of image data comprises:
determining, for each image in the preliminary set of image data, an image owner use permission;
identifying one or more persons depicted in the preliminary set of image data; and
determining for each of the identified one or more persons, a personal likeness use permission.

11. The system of claim 10, wherein determining the image owner use permission comprises one or more of:
determining from an image owner use permission database one or more owner use conditions for one or more images in the preliminary set of image data; and
requesting from an image owner entity one or more owner use conditions for one or more images in the preliminary set of image data; and
wherein determining for each of the identified one or more persons the personal likeness use permission comprises one or more of:
determining from a personal likeness use database one or more personal likeness use conditions for each identified person; and requesting from one or more of the identified one or more persons one or more personal likeness use conditions.

12. The system of claim 10, wherein altering one or images in the preliminary set of image data comprises one or more of:
editing one or more of the alterable images by cropping the image to remove one or more identified persons in the image that have not provided permission for personal likeness use; and
anonymizing one or more identified persons in the image that have not provided permission for personal likeness use.

13. The system of claim 10, wherein compiling the final set of image data comprises one or more of:
selecting one or more permitted images for the final set of image data, wherein the permitted images comprise images where use of the image is permitted by the image owner entity and personal likeness use is permitted by each identified person in a permitted image of the one or more permitted images; and
removing one or more non-permitted images from further processing, wherein the non-permitted images where use of the image is not permitted by the image owner entity or by one or more of the identified persons in the non-permitted images.

14. The system of claim 9, wherein compiling the final set of image data comprises:
identifying one or more properties of the image data in the preliminary set of image data; and
selecting, using the one or more properties, one or more pre-approved images for the final set of image data, wherein the one or more pre-approved images comprise images where use of the image is known to be permitted by an image owner entity and personal likeness use is known to be permitted by each identified person in the permitted image.

15. A computer program product for permissioned image compilation, the computer program product comprising:
a non-transitory computer-readable storage medium having computer-readable program code embodied therewith, the computer-readable program code executable by one or more computer processors to perform an operation comprising:
receiving an image data request from a requesting entity, wherein the image data request comprises content conditions specifying one or more types of requested image data and an intended use for the requested image data;
selecting, from an image database and based on the image data request, a preliminary set of image data, wherein the preliminary set of image data is selected based on the one or more types of requested image data and the intended use for the requested image data;
determining one or more image use permissions for the preliminary set of image data;
altering one or more images in the preliminary set of image data based on the one or more image use permissions to produce a permissioned set of image data,
wherein the permission set of image data comprises a plurality of permissioned images,
wherein each permissioned image of the plurality of permissioned images comprises an image use permission from an image owner entity and a personal likeness use permission from each identified person in the permissioned image, wherein the image owner entity comprises a copyright owner for a respective image of the plurality of permissioned images, wherein a personal likeness use permission for an identified person of the each identified person comprises a permission to use a depiction of the identified person in the permissioned set of image data, and wherein the image owner entity comprises a different entity from at least one identified person in the permissioned image;

compiling a final set of image data from the permissioned set of image data and from the preliminary set of image data based on the one or more image use permissions; and providing the final set of image data to the requesting entity.

16. The computer program product of claim 15, determining one or more image use permissions for the preliminary set of image data comprises:

determining, for each image in the preliminary set of image data, an image owner use permission;

identifying one or more persons depicted in the preliminary set of image data; and determining for each of the identified one or more persons, a personal likeness use permission.

17. The computer program product of claim 16, wherein determining the image owner use permission comprises one or more of:

determining from an image owner use permission database one or more owner use conditions for one or more images in the preliminary set of image data; and requesting from an image owner entity one or more owner use conditions for one or more images in the preliminary set of image data; and wherein determining for each of the identified one or more persons the personal likeness use permission comprises one or more of:

determining from a personal likeness use database one or more personal likeness use conditions for each identified person; and requesting from one or more of the identified one or more persons one or more personal likeness use conditions.

18. The computer program product of claim 16, wherein altering one or images in the preliminary set of image data comprises one or more of:

editing one or more of the alterable images by cropping the image to remove one or more identified persons in the image that have not provided permission for personal likeness use; and anonymizing one or more identified persons in the image that have not provided permission for personal likeness use.

19. The computer program product of claim 16, wherein compiling the final set of image data comprises one or more of:

selecting one or more permitted images for the final set of image data, wherein the permitted images comprise images where use of the image is permitted by the image owner entity and personal likeness use is permitted by each identified person in a permitted image of the one or more permitted images; and removing one or more non-permitted images from further processing, wherein the non-permitted images where use of the image is not permitted by the image owner entity or by one or more of the identified persons in the non-permitted images.

20. The computer program product of claim 15, wherein compiling the final set of image data comprises:

identifying one or more properties of the image data in the preliminary set of image data; and selecting, using the one or more properties, one or more pre-approved images for the final set of image data, wherein the one or more pre-approved images comprise images where use of the image is known to be permitted by an image owner entity and personal likeness use is known to be permitted by each identified person in the permitted image.

* * * * *